(12) United States Patent
Fukuda

(10) Patent No.: US 8,639,183 B2
(45) Date of Patent: Jan. 28, 2014

(54) COMMUNICATIONS SYSTEM AND MEMORY CARD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1164 days.

(21) Appl. No.: 12/103,504

(22) Filed: Apr. 15, 2008

(65) Prior Publication Data

US 2009/0256684 A1    Oct. 15, 2009

(30) Foreign Application Priority Data

May 7, 2007    (JP) .................. 2007-122121

(51) Int. Cl.
*H04B 5/00* (2006.01)
*H04B 7/00* (2006.01)
*H04M 1/00* (2006.01)

(52) U.S. Cl.
USPC ........................ 455/41.1; 455/41.3; 455/558

(58) Field of Classification Search
USPC ............. 455/41.1, 41.2, 41.3, 66.1, 558, 574, 455/343.2, 343.3, 343.4
See application file for complete search history.

(56) References Cited

U.S. PATENT DOCUMENTS

| 5,629,981 | A * | 5/1997 | Nerlikar ........................ 713/168 |
| 7,370,810 | B2 * | 5/2008 | Nara ............................. 235/492 |
| 2002/0039325 | A1 * | 4/2002 | Aizawa ......................... 365/233 |
| 2003/0218532 | A1 * | 11/2003 | Hussmann ..................... 340/5.8 |
| 2005/0233704 | A1 * | 10/2005 | Maekawa ....................... 455/69 |
| 2006/0046655 | A1 * | 3/2006 | Terashima ..................... 455/41.2 |
| 2006/0158310 | A1 * | 7/2006 | Klatsmanyi et al. .......... 340/10.1 |
| 2009/0055667 | A1 * | 2/2009 | Luo et al. ...................... 713/322 |
| 2009/0285167 | A1 * | 11/2009 | Hirsch et al. .................. 370/329 |
| 2011/0038191 | A1 * | 2/2011 | Umeda et al. ................. 363/127 |

FOREIGN PATENT DOCUMENTS

| JP | 1989 182782 | 7/1989 |
| JP | 02-196390 | 8/1990 |
| JP | 2002-259924 | 9/2002 |
| JP | 2005 64822 | 3/2005 |
| JP | 2006-173691 | 6/2006 |
| JP | 2006-174143 | 6/2006 |
| JP | 2006 216011 | 8/2006 |
| JP | 2006-229558 | 8/2006 |
| JP | 2006-350861 | 12/2006 |
| WO | 2006-040829 | 4/2006 |

* cited by examiner

*Primary Examiner* — Andrew Wendell
(74) *Attorney, Agent, or Firm* — K&L Gates LLP

(57) ABSTRACT

Disclosed herein is a communications system in which a transponder having no radio wave generating source executes data transmission with a reader/writer. The transponder is incorporated in a memory card having a memory with which the reader/writer reads and writes information the memory card being used as loaded in a dedicated slot of a host device. The reader/writer transmits a beacon signal telling a service area at a predetermined time interval. The memory card waits for a beacon signal from the reader/writer within a preset period of time after the host device loaded with the memory card is powered on, executes a connection establishment procedure with the reader/writer upon reception of the signal within the preset period of time and, if the beacon signal has not been received within die preset period of time, enters a sleep state in which at least a wait state of the transponder is stopped.

12 Claims, 11 Drawing Sheets

F I G . 3
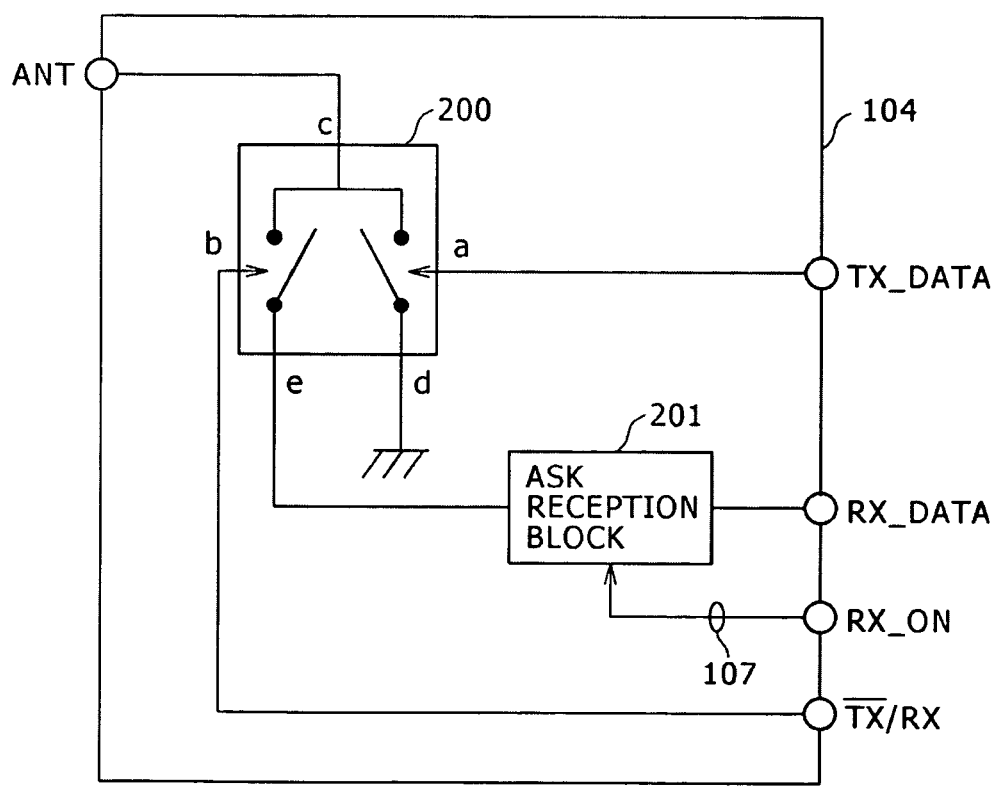

COMMUNICATIONS SYSTEM AND MEMORY CARD

CROSS REFERENCES TO RELATED APPLICATIONS

The present application claims priority to Japanese Patent Application JP 2007-122121 filed in the Japan Patent Office on May 7, 2007, the entire contents of which being incorporated herein by reference.

BACKGROUND

The present application relates to a communications system of noncontact type in which a communications terminal (or a transponder) containing no radio generating source transmits data with a device (or a reader/writer) that is a communications mate in a wireless manner and a memory card having a radio section that operates as a transponder in a noncontact communications system. For example, the present application relates to a communications system and a memory card that are configured to execute data communication based on a reflected-wave transmission scheme by use of die transmission of non-modulated carrier from a reflected-wave reader side and the absorption and reflection of received radio based on an antenna terminal operation on the side of a reflector.

More specifically, the present application relates to a communications system and a memory card that are configured to establish connection through a service entry sequence in which a reader/writer transmits a beacon frame at a predetermined period to tell an own station service area and a transponder returns a response frame for the beacon frame and relates and, more particularly, to a communications system and a memory card that are configured to reduce power dissipation on the side of a transponder involved in a connection establishment procedure of a service entry sequence for example.

A noncontact communications system called RFID (Radio Frequency Identification) is known as a communications system that is configured to transmit data by radio without having an own radio generating source. The RFID is also referred to as an ID system and a data carrier system. Commonly used worldwide is an RFID system or simply RFID, a recognition system based on high frequency (radio). The RFID system is made up of a transponder called a tag and a reader/writer for accessing the transponder. The transponder passively operates on the radio supplied from the reader/writer as an energy source and the reader/writer reads information from the transponder and writes information thereto.

The noncontact communications methods based on the RFID include electrostatic coupling, electromagnetic inducting, and radio communicating, for example. The RFID system based on electromagnetic inducting is made up of a primal coil in the reader/writer side and a secondary coil on the transponder side. The reader/writer transmits an AC signal of a predetermined carrier frequency to supply power and the transponder side receives this AC signal at the secondary coil and rectifies the received AC signal to take out power for operation. The transponder can transmit data to the reader/writer by executing modulation, such as amplitude modulation, by load switching of the secondary coil.

With the RFID system based on radio communicating, the transponder has a reflector configured to transmit data by a reflected wave obtained by modulating a non-modulated carrier and the reader/writer has a reflected-wave reader configured to read data from a modulation reflected-wave signal received from the reflector, thereby executing reflected-wave transmission also called backscatter. Receiving a non-modulated carrier from the reflected-wave reader, the reflector modulates the reflected wave on the basis of antenna load impedance switching for example, thereby superimposing data onto the carrier. Namely, because the reflector requires no carrier generating source, a data transmission operation can be driven at low power dissipation. The reflected-wave reader receives the modulated reflected wave thus obtained and demodulates and decodes the received wave to get transmission data.

Basically, the reflector has an antenna for reflecting radio that is an incident continuous wave, transmission data generating circuit, and an impedance variation circuit for varying a load impedance of the antenna in correspondence with transmission data (refer to Japanese Patent Laid-Open No. Hei 1-182782, referred to as Patent Document 1 hereinafter for example). The impedance variation circuit is an antenna switch for switching between open and ground of the terminal of the antenna, for example. This antenna switch may be made up of a CMOS (Complementary Metal Oxide Semiconductor) transistor by building the antenna switch into a circuit module. It is also practicable to configure the antenna switch by a GaAs (Gallium Arsenide) IC (Integrated Circuit), separate from the circuit module, thereby realizing high-speed switching at low power dissipation. In the latter, a data transmission rate based on reflected-wave modulation is enhanced, while the power dissipation is suppressed below several 10 µW. Therefore, considering a power dissipation of about several hundred mW to several W in a wireless LAN (Local Area Network), the reflected-wave communication can be said to be remarkably higher in performance than the average power dissipation of a general LAN (refer to Japanese Patent Laid-open No. 2005-64822, referred to as Patent Document 2 hereinafter, for example).

Because the transponder carrying a reflector executes an operation of reflecting received radio, the transponder is not regarded as a radio station, so that this transponder can be advantageously handled as outside the regulations imposed on radio communication. While noncontact communications systems in the past use frequencies of several MHz to several hundred MHz (13.56 MHz for example), the reflected-wave transmitting can use a high-frequency band of 2.4 GHz (microwave) called ISM (Industry Science and Medical Band), for example, thereby realizing high-speed data transmission.

In one tropical exemplary use of a noncontact communications system, a host device incorporating a transponder, such as a reflector, is arranged on the reading surface of a reader/writer, such as a reflected-wave reader as shown in FIG. 11, thereby executing information reading and writing on the transponder.

The transponder can get an electrical power by rectifying a carrier transmitted from the reader/writer; but this power is not enough for the transmission of large amounts of data at high frequencies. Namely, with the transponder, an electrical power for generating a carrier at the time of transmission is not required, while an electrical power necessary for a transmitting operation for modulating a reflected wave and a receiving operation for demodulating and decoding a modulated signal from the reader/writer is supplied from the host device.

For example, if the transponder is built in portable information terminals, such as a digital camera and a mobile phone with camera and a mobile terminal device, such as a portable music player, which are minimized in power dissipation and the reader/Titer is built in information equipment based on stationary household appliances, such as a television set, a display monitor, a printer, a personal computer (PC), and a VTR (video Tape Recorder), a DVD (Digital Versatile Disc) player, then bringing the transponder and the reader/write to proximity of each other allows uploading of image data taken by a mobile phone with camera or a digital camera to the PC in a noncontact manner, thereby storing, displaying, or printing the uploaded image data.

A memory card having capabilities of transponder, such as a reflector, is proposed (refer to Japanese Patent Laid-open No. 2006-216011, referred to as Patent Document 3 hereinafter, for example). Such a host device loaded with such a memory card as a digital camera or a mobile phone can access the loaded memory, card via a wired interface. On the other hand, an external device, such as a PC or a printer, can read data from a loaded memory card via a reflected-wave transmission route independently of the host device loaded with the memory card. Namely, a noncontact communications operation can be controlled out of control of the host device loaded with a memory card, so that the host device does not have to install any driver software necessary for controlling noncontact communication.

Data transmission between transponder and reader/writer requires to establish connection therebetween. For one of communications establishing procedures, a service entry sequence is proposed in which the reader/writer transmits a beacon frame at certain intervals to tell a service area of own station.

FIG. 12 shows a communications control sequence for executing reflected-wave transmission between transponder and reader/writer by use of the above-mentioned service entry, sequence.

The reader/writer periodically transmits a beacon frame to tell the service area of own station. Also, in an entry period to be provided after the transmission of a beacon frame, the reader/writer continues to transmit a non-modulated carrier for operating the transponder.

On the other hand, the transponder receives a beacon frame to know the existence of the reader/writer and uses the non-modulated carrier received within the entry period to return an enter frame in response to the received beacon frame.

FIG. 13 shows a sequence in which a communications operation is started between reader/writer and transponder by use of the service entry sequence shown in FIG. 12.

The reader/writer executes the transmission of beacon frames at certain time intervals in an intermittent manner. The transponder may not receive beacon frames outside a radio reach range; but, when the transponder gets in the radio reach range and a beacon frame comes, the transponder executes the processing of receiving the beacon frame.

On the basis of the information written to the payload of the received beacon frame, the transponder gets information about communications frequency channels to be used and information such as the ID unique to the reader/writer. In order to establish connection with the reader/writer, the transponder returns an entry frame in an entry period by use of a non-modulated carrier.

On the basis of the written contents of the entry frame, the reader/writer gets the information such as the ID unique to the transponder and communications parameters that can be set. In order to make communication with the transponder, the reader/writer transmits a connection request frame with specified information such as communications parameters written to the payload. In response to this connection request, the transponder returns a connection answer frame with the information such as a connection result written to the payload, upon which the connection between transponder and reader/writer is established. While the connection is established, information is read from the transponder and written thereto by repeating the transmission of command frames from the reader/writer and the return of response frames by the transponder.

The reader/writer does not always have to continue to transmit beacon frames at certain time intervals. For example, the reader/writer may establish connection through the same connection request/answer sequence as described above after the transmission of a beacon frame (or an irregular transmission request signal) when to read information from the transponder. Namely, the reader/writer can suppress the transmission of unnecessary beacon frames and the transmission of the non-modulated carrier during an entry period.

On the contrary, on the transponder side, the timing of the transmission of a beacon frame from the reader/writer is unclear, so that the transponder has to execute a wait operation. For example, with the system configuration (described above) in which the transponder such as a reflector is incorporated in a memory card, which is loaded on a battery-driven host device such as a digital camera or a mobile phone, it is unclear for the memory, card to know when the host device is brought to the proximity of the reader/writer to start data transmission. Therefore, it is necessary for the transponder built in the memory card to always wait for the arrival of a beacon frame.

Although the transponder need not the power for generating a carrier at the time of transmission, the transponder uses the electrical power of the host device for a transmitting operation to modulate a reflected wave and a receiving operation to receive an information signal from the reader/writer (as described above). Hence, the power dissipation in the transponder's wait state presents a serious problem for the host device.

Especially, for applications in which high-speed data transmission of about 20 Mbps in 2.4 GHz band is executed, it is unrealistic to put the memory card always in a wait state.

SUMMARY

Therefore, the present application addresses the above-identified and other problems associated with related-art methods and apparatuses and solves the addressed problems by providing a communications system and a memory card that are configured for the transponder having no radio wave generating source thereof to suitably execute data transmission with the reader/writer.

Another aspect is the provision of a communications system and a memory card that are configured such that the transponder built in a host device operates on an electrical power supplied therefrom, thereby suitably executing high-frequency band and large amounts of data transmission with the reader/writer.

Still another aspect is the provision of a communications system and a memory card that are configured such that connection between the reader/writer and the transponder is established through a service entry sequence in which the reader/writer transmits a beacon frame in a predetermined period to tell a service area of the reader/writer and the transponder returns a response frame for the beacon frame.

Yet another aspect is the provision of a communications system and a memory card that are configured to reduce the power dissipation on the transponder side involved in a connection establishment procedure, such as a service entry sequence.

A separate aspect is the provision of a communications system and a memory card configured to prevent the waste of electrical power on the transponder side caused by a wait operation of the transponder for waiting for a beacon frame or a transmission request signal supplied by the reader/writer.

According to a first embodiment thereof, there is provided a communications system in which a transponder having no radio wave generating source thereof executes data transmission with a reader/writer. In this communications system, the transponder is incorporated in a memory card having a memory with which the reader/writer reads and sprites information, de memory card being used as loaded in a dedicated slot of a host device; the reader/writer transmits a beacon signal telling a service area of the reader/writer at a predetermined time interval, and the memory card waits for a beacon signal from the reader/writer within a preset period of time after the host device loaded with the memory card is powered on, executes a connection establishment procedure with the reader/writer upon reception of the beacon signal within the preset period of time and, if the beacon signal has not been received within the preset period of time, enters a sleep state in which at least a wait state of the transponder is stopped.

It should be noted that term "system" as used herein denotes a logical collective of a plurality of apparatuses (or functional modules intended to realize a particular function) and therefore does not require whether these apparatuses or functional modules are arranged in a single housing or unit.

The present application relates to a noncontact-type communications system in which a transponder having no radio wave generating source of its own passively operates by using, as an energy source, a radio wave transmitted from a reader/writer. For example, the transponder has a reflector configured to receive a non-modulated carrier to transmit a modulated reflected wave multiplexed with data. The reader/writer is made up of a reflected-wave reader configured to read data out of the modulated reflected wave. A communications system based on reflected-wave transmission requires no carrier generating source on the reflector side, so that, as compared with existing wireless communications technologies, such as a wireless LAN, the embodiment of present application uses a significantly low electric power for data transmission.

One of typical use forms of noncontact systems is known as that a host device incorporating a transponder is arranged on the reading plane of a reader/writer and a non-modulated carrier is transmitted from the reader/writer to read information from the transponder and write information thereto. Also, a service entry sequence can applied in which, in establishing connection between transponder and reader/writer, the reader/writer transmits a beacon frame at a predetermined interval to tell a service area of own station and the transponder, having received the beacon frame, returns an entry frame to the reader/writer.

However, in the case of a system configuration in which a transponder is incorporated in a memory card which is used on a battery-driven host device, such as a digital camera or a mobile phone, it is uncertain for the memory card to know when the host device is brought to the proximity of the reader/writer to start data transmission. Therefore, it may be required for the transponder in the memory card to normally wait for the arrival of a beacon signal, and the host device which supplies an electric power to the memory card may require large amount of power dissipation in the wait state.

In contrast, the above-mentioned communications system according to first embodiment is configured that an operation of waiting for a beacon signal in the memory card operates only for a preset period of time after the host device is powered on or after the memory, card is loaded on the host device to power on the host device. In other words, when a timer of the memory card expires before a connection signal comes, the memory cards gets in a sleep state.

Consequently, a terminal apparatus, such as a memory card having a transponder gets in a sleep state if no beacon frame is received, so that the electric power to be consumed in waste for each wait operation in which it is uncertain when data transmission occurs can be saved.

It should be noted that term "sleep state" as used herein denotes a state in which at least the transponder, among circuit modules in the memory card, stops a wait state. In this sleep state, whether any other circuit modules than the transponder is operating or not has no regard to the embodiment of the application.

According to a second embodiment thereof, there is provided a communications system in which a transponder having no radio wave generating source thereof executes data transmission with a reader/writer. In this communications system, the transponder is incorporated in a memory card having a memory with which the reader/writer reads and writes information, the memory card being used as loaded in a dedicated slot of a host device; the reader/writer transmits a beacon signal telling a service area of the reader/writer at a predetermined time internal; and the memory card has rectifying means for obtaining a direct-current voltage by rectifying a signal received from the reader/writer, is normally in a sleep state in which at least a wait state by the transponder is stopped, and returns from the sleep state by use of the direct-current voltage obtained by the rectifying means as a startup interrupt signal, thereby executing a beacon signal waiting by the transponder.

In the communications system according to a second embodiment, the memory card normally maintains a sleep state while the memory card is loaded on the host device. On the other hand, before the transmission of a beacon signal (or before starting a service entry sequence), the reader/writer transmits a non-modulated carrier or a dummy signal, for example. The memory card also has rectifying means for rectifying a non-modulated carrier or a dummy signal into a direct-current voltage. Using the generated direct-current voltage as a startup interrupt signal, the memory card returns from a sleep state to make the transponder start a wait operation. The reader/writer transmits a beacon signal immediately after transmitting a non-modulated carrier or a dummy signal. In response to this transmission, the memory card can return a connection request to the reader/writer. Alternatively, the memory card side can use a direct-current voltage obtained from the beacon signal as a startup interrupt signal.

Because there is no need for supplying an external electric power to the rectifying means, the memory card side does not have to be normally supplied with electrical current. Also, the memory card side generates an interrupt signal, the memory card side may obtain an interrupt voltage rather than getting an electrical current enough for getting a drive power.

Consequently, a terminal apparatus, such as a memory card, waits, in a sleep state, for a beacon frame or a transmission request signal from the reader/writer and, upon reception of the beacon frame or the transmission request signal, returns an answer signal for a connection request signal or a transmission request, thereby getting in a communications state. If the memory card may not receive these signals, the memory card can maintain a sleep state, thereby saving the power otherwise necessary for a wait operation.

Also, the terminal apparatus executes state transition control in which the memory card, if an electric power obtained by rectifying the received carrier or signal exceeds a predetermined level, gets into a communications state, thereby realizing lower power dissipation at the time of wait operation.

As described and according to an embodiment, a communications system and a memory card are provided that are configured to suitably establish connection between reader/writer and transponder by reader/writer's telling a service area of its own by transmitting a beacon frame at a predetermined interval and transponder's returning an answer frame for the beacon frame.

Also, according to an embodiment, a communications system and a memory card are provided that are configured to significantly reduce the power dissipation on the transponder side involved in a connection establishment procedure, such as service entry sequence.

Further, according to the present embodiment, a communications system and a memory card are provided that are configured to prevent the electric power from being wasted on the transponder side at the time of an operation of waiting for a beacon frame or a transmission request signal from the reader/writer.

In the communications systems according to an embodiment, a terminal apparatus, such as a memory card having a transponder, waits, in a sleep state, for a beacon frame or a transmission request signal from a reader/writer and gets in a communications state by returning a connection request signal or an answer signal for transmission request if the beacon frame or the transmission request signal has been received; but, if these frame or signal has not been received, the memory card maintains a sleep state, thereby significantly saving the electrical power otherwise consumed for the wait operation. Also, a terminal apparatus, such as a memory card, executes state transition control in which the memory card rectifies a non-modulated carrier or a dummy signal (or a beacon signal or a connection request signal for transponder) and, when a resultant electrical power exceeds a predetermined level, gets into a communications state, thereby significantly saving the electrical power otherwise necessary for the wait operation.

For example, application of the present embodiment to a use form in which a memory card having transponder capabilities such as a reflector is used as loaded on a host device such as a digital camera or a mobile phone for example allows the significantly lowering of the power dissipation of the memory card in a wait state and contributes to low power dissipation of the battery-driven host device.

Additional features and advantages are described herein, and will be apparent from the following Detailed Description and the figures.

BRIEF DESCRIPTION OF THE FIGURES

FIG. 3 is a circuit diagram illustrating an exemplary internal configuration of a radio block in the memory card shown in FIG. 2;

DETAILED DESCRIPTION

The present application will be described in further detail by way of embodiments thereof with reference to the accompanying drawings.

Figure 1:
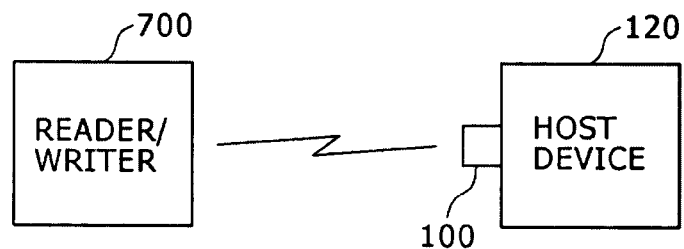
FIG. 1 is a schematic diagram illustrating in exemplary configuration of a communications system according to an embodiment.

Now, referring to FIG. 1, there is schematically shown an exemplary configuration of a communications system practiced as one embodiment. The communications system shown has a memory card 100 in which a transponder, not shown, is incorporated, a host device 120 on which the memory card 100 is loaded in a dedicated slot of the host device 120, and a reader/writer 700 configured to execute noncontact data transmission with the transponder. The transponder passively operates on the radio wave supplied from the reader/writer 700 as the energy source. The reader/writer 700 reads information from the transponder and writes information thereto.

Noncontact communications methods include electrostatic coupling, electromagnetic inducting, and radio communicating, for example. In what follows, the application of radio communicating is assumed, thereby executing reflected-wave transmission called backscatter. The reflected-wave communicating is characterized by low power dissipation in a communications form in which the transmission from the reflector side occupies most of communication.

The transponder has a reflector configured to transmit data bed a reflected wave obtained by modulating a non-modulated carrier. The reader/writer 700 has a reflected-wave reader configured to read the data out of a modulated reflected-wave signal supplied from the reflector. Receiving a non-modulated carrier from the reflected-wave reader, the reflector modulates the received reflected wave by switching between antenna load impedances for example, thereby superimposing data on the non-modulated carrier. The reflected-wave reader receives this modulated reflected wave to demodulate and decode the received modulated reflected wave, thereby getting transmission data.

Configuring an antenna load impedance switch with a GaAs IC allows a high-speed switching operation with low power dissipation, which is smaller than about several 10 μW.

This configuration can also realize high-speed data transmission in a high frequency band of 2.4 GHz (micro wave).

Although the transponder can get electrical power by rectifying a carrier transmitted by the reader/writer 700, the electrical power thus obtained is insufficient for the transmission of large amounts of data at high speeds. Namely, the transponder need not the electrical power for generating a carrier at the time of transmission; however, an electrical power necessary for executing a transmitting operation for modulating a reflected wave and a receiving operation for demodulating and decoding a modulated signal from the reader/writer 700 is supplied from the host device 120.

Figure 12:
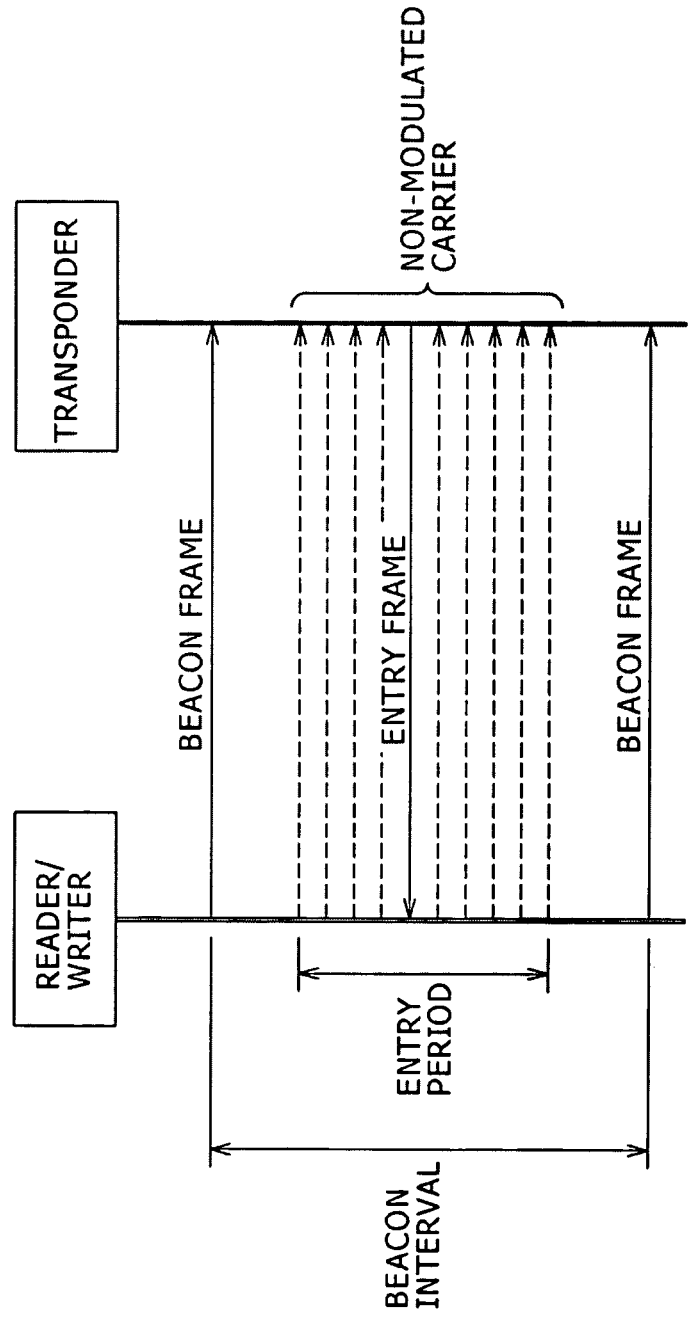
FIG. 12 is a sequence chart indicative of a communications control sequence in which reflected-wave transmission is executed between the transponder and the reader/writer by use of a service entry sequence.
Figure 13:
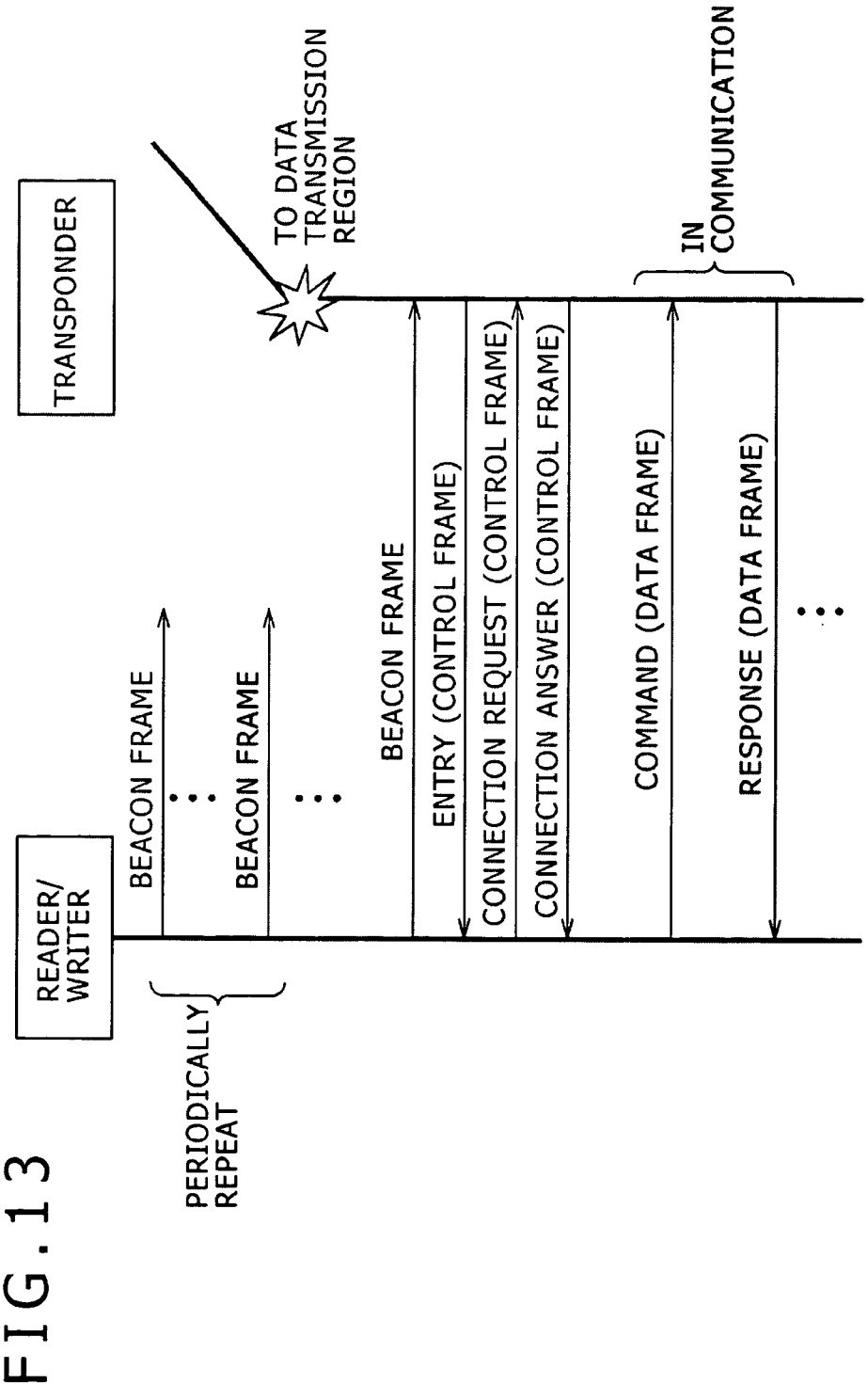
FIG. 13 is a sequence chart indicative of a sequence in which a communications operation is started by use of the service entry sequence shown in FIG. 12 between the reader/writer and the transponder.

It should be noted that the present embodiment assumes the application of the service entry sequence shown in FIGS. 12 and 13 to the communications control between the transponder and the reader/writer 700.

Figure 2:
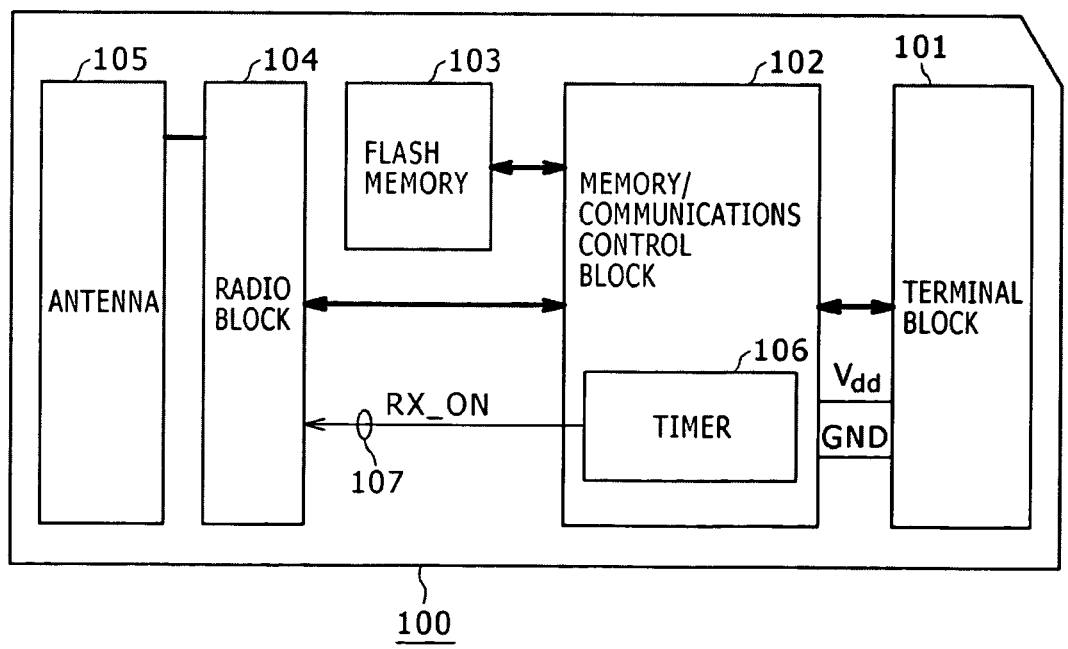
FIG. 2 is a block diagram illustrating an exemplary internal configuration of a memory card in which a transponder is incorporated.

FIG. 2 shows an exemplary internal configuration of the memory card 100 in which a transponder is built. The memory card 100 shown has a flash memory 103 making up storage means, a terminal block 101, a memory/communications control block 102, a radio block 104, and an antenna 105.

A contact portion of the terminal block 101 is exposed outside being connectible with the host device 120 as with an ordinary memory card. The flash memory 103 is able to store data in an electrically rewritable manner. The memory/communications control block 102 transfers data between the host device 120 and the flash memory 103 via the terminal block 101 and transmits data of the flash memory 103 to the reader/writer 700 via the radio block 104 and the antenna 105 in the form of reflected waves. The radio block 104 is equivalent to a transponder in a noncontact communications system.

The memory/communications control block 102 has a timer 106 for use in waiting for a connection signal from the reader/writer 700. The timer 106 can control a receiving operation of the radio block 104; namely, activating an RX_ON signal 107 turns on (energizes) the reception of the radio block 104. Also, when timer $T_S$ for waiting for a connection signal from the reader/writer 700 has expired, the timer 106 turns off (de-energizes) the RX_ON signal, upon which the receiving operation of the radio block 104 slops.

The memory/communications control block 102 accepts power signal line $V_{dd}$ and ground signal line GND from the terminal block 101. With the memory card 100 unloaded from the host device 120, the potential of the power signal line $V_{dd}$ is zero and the ground signal line GND is in an open state. On the other hand, when the memory card 100 is loaded in the dedicated slot of the host device 120, a potential is applied to power signal line $V_{dd}$ and ground signal line GND is put in a ground state. Therefore, the memory/communications control block 102 can detect the unloaded state of the memory card 120 and the power on/off state of the host device by monitoring power signal line $V_{dd}$ and ground signal line GND.

In the present embodiment of the application, the memory/communications control block 102 starts up the timer 106 when the memory card 100 is powered on by the host device 120 upon loading the memory card 100 onto the host device 120, for example. The timer 106 activates RX_ON signal 107 for a period until timer $T_S$ of connection signal wait from the reader/writer 700 has expired, thereby turning on the reception of the radio block 104. In addition, when timer $T_S$ has expired, the timer 106 turns off the RX_ON signal 107 to stop the receiving operation of the radio block 104, putting the memory card 100 into a sleep state.

Thus, a beacon frame wait operation of the radio block 104 continues for a preset period after the power-on upon loading of the memory card 100 on the host device 120. Then, when timer $T_S$ has expired, the memory card 100 gets in a sleep state in which at least the wait operation by the radio block 104 stops. Thus, the memory card 100 gets in a sleep state when a beacon frame cannot be received, so that the wasted power dissipation of the host device 120 can be prevented by preventing the memory card 100 from getting in a wasted wait state by not knowing when a next data transmission starts.

FIG. 3 shows an exemplary internal configuration of the radio block 104 in the memory card 100 shown in FIG. 2. The radio block 104 shown, equivalent to a transponder in a noncontact system, can operate here as a reflector in reflected-wave transmission.

Reference numeral 200 denotes an antenna switch of an SPDT (Single Pole/Double Throw Switch), which also switches between reflected-wave generation and transmission/reception. In the figure, terminal c is connected to the antenna 105 in the memory card 100. The antenna switch 200 is configured by a GaAs IC, for example, separate from another CMOS circuit module.

When transmission is made from the radio block 104, terminal b is turned off by a control signal (TX/RX) from a baseband control block (not shown). Next, transmission data (TX_DATA) is applied to terminal a from the baseband control block. As shown in the figure, because terminal d of the antenna switch 200 is grounded, if the transmission data is "1", the terminal of the antenna 105 is short-circuited; if the transmission data is "0", the terminal of the antenna 105 is opened. Thus, on the basis of an hit image of transmission data, the switching of the antenna switch 200 (namely, the switching of the terminal of the antenna 105) phase-modulates a non-modulated carrier received from the antenna 105, the phase-modulated carrier being radiated from the antenna 105 as a modulated reflected-wave signal.

On the other hand, at the time of reception by the radio block 104, terminal b is kept on by the baseband control block, not shown. Therefore, an ASK (Amplitude Shift Keying) modulated signal received at the antenna 105 is transmitted to an ASK reception block 201 via terminal e to be demodulated into reception data (RX_DATA). Thus, the reception data is passed to the baseband control block, not shown.

Figure 4:
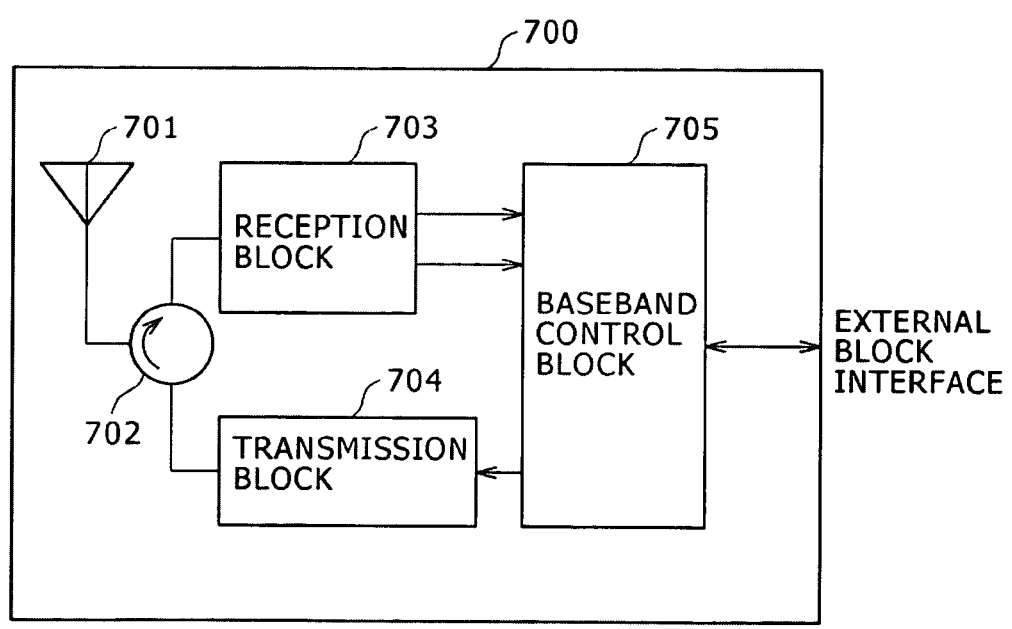
FIG. 4 is a block diagram schematically illustrating an exemplary internal configuration of a reader/writer that is a reflected-wave reader with which the radio block shown in FIG. 3 communicates.

FIG. 4 schematically shows an exemplary internal configuration of the reader/writer 700 as a reflected-wave reader with which the radio block 104 shown in FIG. 3 makes communication. The reader/writer 700 shown has an antenna 701, a circulator 702, a reception block 703, a transmission block 704, and a baseband control block 705.

The transmission block 704 generates a non-modulated carrier as instructed by the baseband control block 705. The non-modulated carrier is radiated toward the radio block 104 from the antenna 701 via the circulator 702. The circulator 702 is used to separate the transmission wave from the reception wave when transmission and reception are executed at the same time.

As described above, the radio block 104 generates a reflected wave for the non-modulated carrier from the reader/writer 700, the reflected wave being phase modulated in accordance with read data, so that the reflected wave is returned to the reader/writer 700 as a modulated reflected wave. Being received by the reception block 703 via the antenna 701 aid the circulator 702, this modulated reflected wave is converted into a baseband IQ signal made up of in-phase (I) and quadrature (Q) thereof to be demodulated in the baseband control block 705.

In transmitting data and a control command from the reader/writer 700 to the radio block 104, the transmission block 704 generates an ASK modulated wave in accordance with transmission data from the baseband control block 705, the generated ASK modulated wave being radiated from the antenna 701.

The baseband control block 705 has an interface for other devices. This interface can decode read image data and supply the decoded image data to a television set (not shown) as a video signal to be displayed or to a PC (not shown), connected via USB (Universal Serial Bus).

Figure 5:
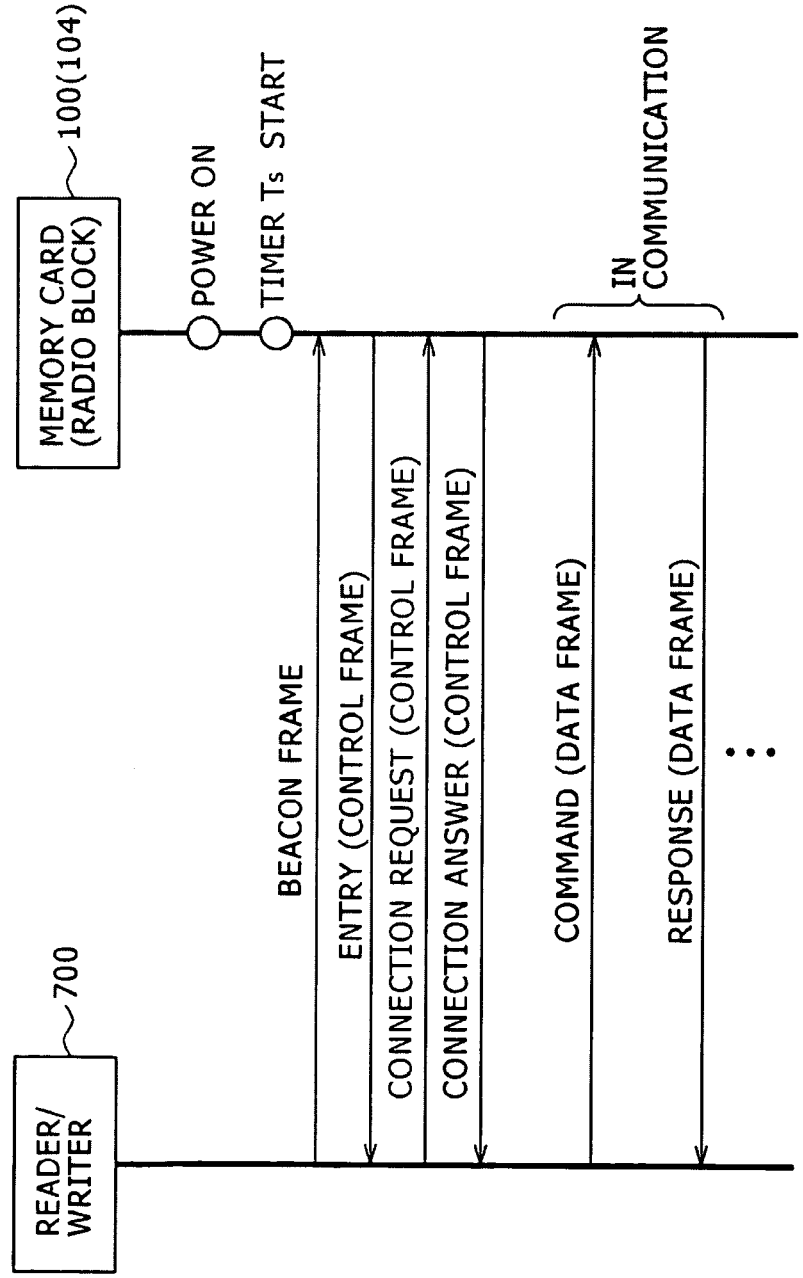
FIG. 5 is a sequence chart indicative of a communications control sequence in which the memory card shown in FIG. 3 communicates with the reader/writer.

FIG. 5 shows a communications control sequence that is executed by the memory card 100 shown in FIG. 3 with the reader/writer 700.

A receiving operation of the radio block 104 as a transponder is kept on during a period from the staring up of the timer 106 by powering on the memory card 100 by the host device 120 with the memory card 100 loaded on the host device 120 to the expiration of timer $T_S$ waiting for a connection signal from the reader/writer 700.

On the other hand, in order to tell the service areas of own station, the reader/writer 700 periodically transmits a beacon frame and, in an entry period provided after the transmission of a beacon frame, continues transmitting a non-modulated carrier for operating the transponder.

If the radio block 104 can receive a beacon frame until timer $T_S$ expires, namely, before transition to a sleep state, the radio block 104 can detect that the radio block 104 is in the service area of the reader/writer 700.

Next, on the basis of information written to the payload of the received beacon frame, the radio block 104 gets information about a communications frequency channel to be used and information, such as the unique ID of the reader/writer 700. Then, when the radio block 104 wants to be connected with the reader/writer 700, the radio block 104 returns an entry frame by use of the non-modulated carrier transmitted from the reader/writer 700 over the entry period.

On the basis of the contents written to the entry frame, the reader/writer 700 gets the unique ID of the radio block 104 (or the memory card 100) as the transponder and the information about settable communications parameters. Then, when the reader/writer 700 wants to communicate with the memory card 100, the reader/writer 700 transmits a connection request frame with the information specifying communications parameters written to the payload. If the memory card 100 responds to the connection request, the memory card 100 returns a connection answer frame with a connection result written to the payload to the reader/writer 700 via the radio block 104, upon which the connection is established.

While the connection is in the established state, the transmission of a command frame from the reader/writer 700 and the return of a response frame from the radio block 104 are repeated (not shown), thereby executing information reading and writing operations with the flash memory 103 ion the memory card 100.

Figure 6:
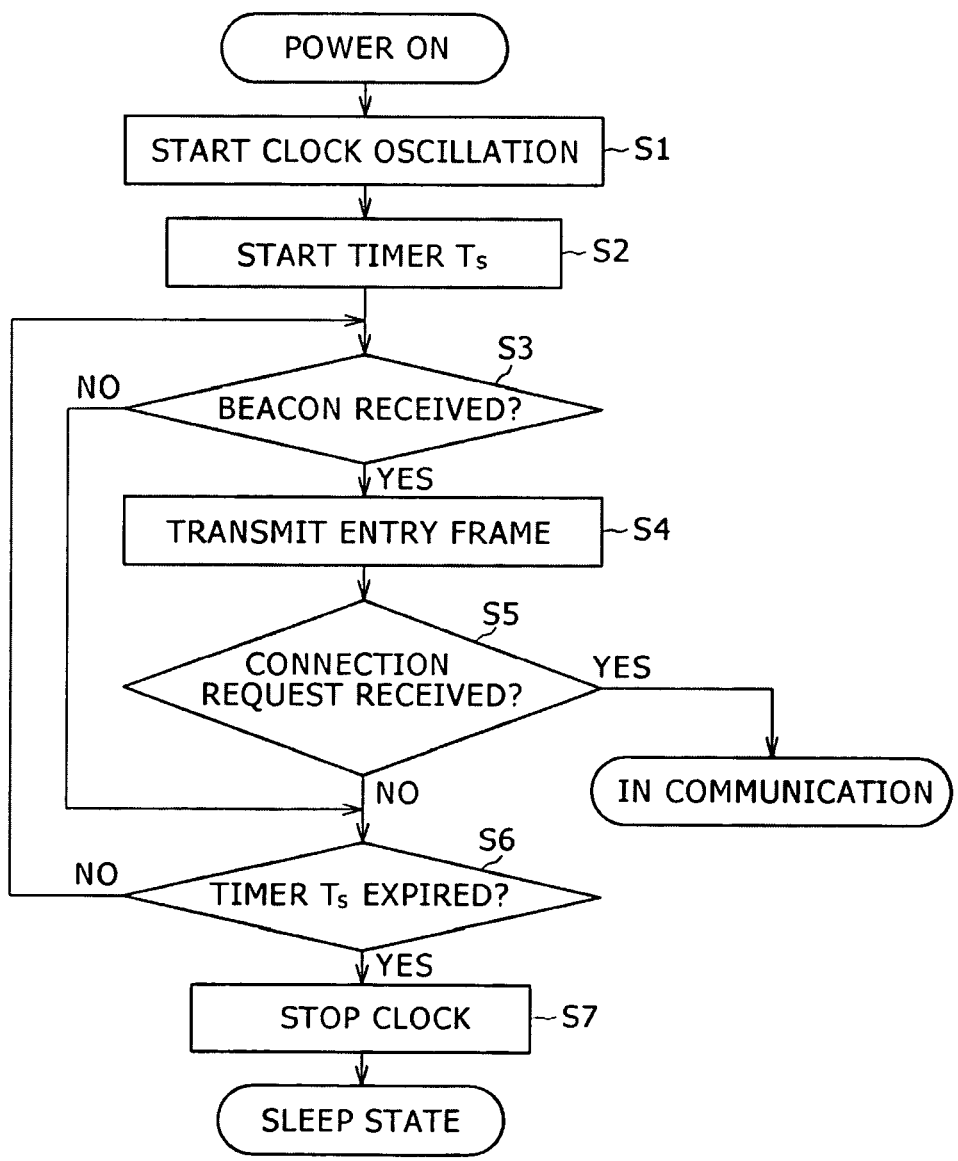
FIG. 6 is a flowchart indicative of a power control procedure in the memory card shown in FIG. 2.

Thus, in the communications control procedure shown in FIG. 5, the memory card 100, loaded on the host device 120, for example, executes power control in accordance with a timing of power supply from the host device 120. FIG. 6 shows a flowchart indicative of a power control procedure to be executed in the memory card 100 shown in FIG. 2.

First, powering on the host device 120 gives a trigger for restoring the memory card 100 from the sleep state to the normal wait state. If the host device 120 is already in the on state, the host device 120 is turned off and then turned on again.

When the power supply from the host device 120 to the memory card 100 starts upon the powering on of the host device 120, the internal clock in the memory card 100 starts oscillating (step S1).

Next, in the memory/communications control block 102, the timer 106 starts for clocking a time of waiting for a beacon frame transmitted from the reader/writer (step S2). Until timer $T_S$ expires, the timer 106 activates the RX_ON signal 107 to turn on the reception of the radio block 104.

While the reception is on, the radio block 104 checks whether a beacon frame has come from the reader/writer 700 (step S3).

If the radio block 104 receives no beacon frame (NO in step S3), then the procedure goes to step S6 by skipping steps S4 and S5.

On the other hand, if the radio block 104 has received a beacon frame (YES in step S3), then the radio block 104 returns an entry frame (step S4) by use of a non-modulated carrier transmitted from the reader/Titer 700 over the entry period.

Next, the radio block 104 waits for a connection request frame from the reader/writer 700 (step S5). When the connection request frame has been received (YES in step S5), then the radio block 104 returns a connection answer frame to the reader/writer 700 to establish connection, thereby entering a state communication with the reader/writer 700.

If no beacon frame has been received from the reader/writer 700 (NO in step S3) or, although an entry frame has been returned in response to the received beacon frame, no connection request frame has arrived from the reader/writer 700 (NO in step S5), then radio block 104 checks whether timer $T_S$ has expired at the timer 106 (step S6).

If timer $T_S$ is found not expired (NO in step S6), then the procedure returns to step S3, in which the radio block 104 waits for a beacon frame.

If no beacon frame has been received or, although an entry frame has been returned in response to a received beacon frame, a connection request frame has not been received from the reader/writer 700, thereby disabling the establishment of connection with the reader/writer 700 until timer $T_S$ in the timer 106 has expired (YES in step S6), the memory card 100 stops the internal clock (step S7) to stop all internal operations, getting into a sleep state.

Thus, the memory card 100 waits for a beacon signal for a certain period; however, if communication with the reader/writer 700 does not start, the memory card 100 gets in a sleep state, thereby realizing low power dissipation. In a sleep state, the clock of the memory card 100 is stopped, so that a total of several 10 µA of current consumption can be saved.

Figure 7:
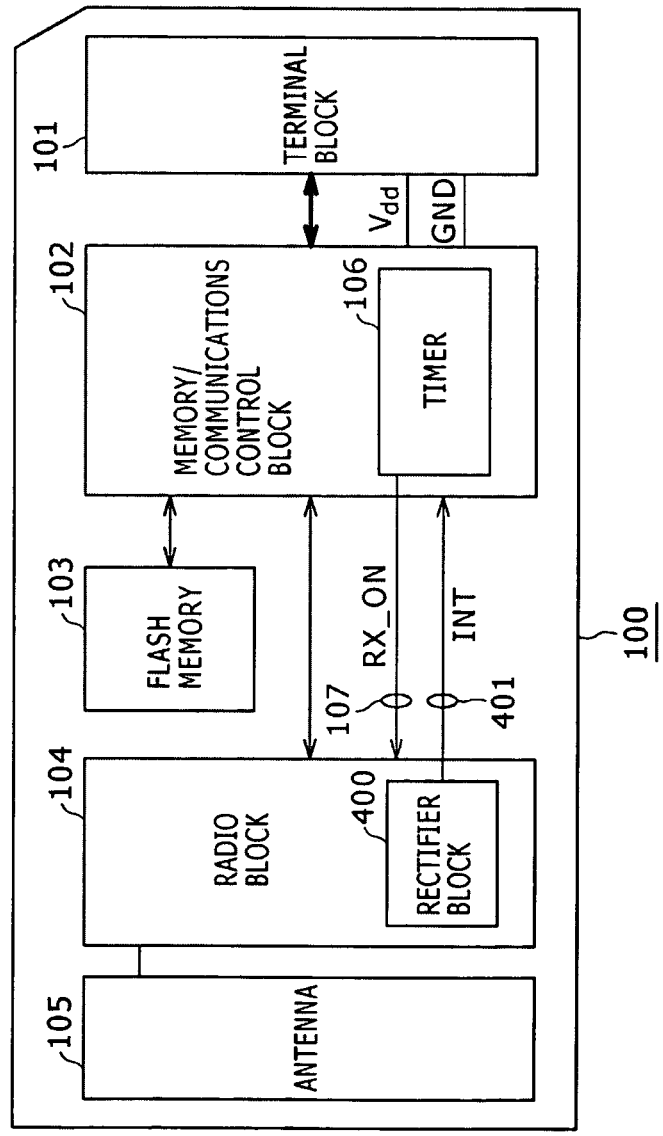
FIG. 7 is a block diagram illustrating another exemplary internal configuration of the memory card in which a transponder is incorporated.

FIG. 7 shows another exemplary internal configuration of a memory card 100 in which a transponder is incorporated. In this configuration, the memory card 100 has a flash memory 103 providing storage means, a terminal block 101, a memory/communications control block 102, a radio block 104, and an antenna 105.

As with the exemplary configuration shown in FIG. 2, the memory card 100 shown in FIG. 7 has a timer 106 on the memory/communications control block 102, which waits for a connection signal from the reader/writer 700. When the memory/communications control block 102 starts up the timer 106, the timer 106 activates an RX_ON signal 107 to turn on the reception of the radio block 104. Also, when timer $T_S$ of waiting for a connection signal from the reader/writer 700 has expired, the timer 106 turns off the RX_ON signal 107, upon which the memory card 100 gets in a sleep state.

The memory card 100 shouts in FIG. 7 has a rectification block 400 in the radio block 104 as a transponder, which is a difference from the configuration shown in FIG. 2. The rectification block 400 rectifies a non-modulated carrier or a dummy signal received from the reader/writer 700 to generate a DC (Direct Current) voltage and uses the generated DC voltage as an interrupt signal (INT) 401 for interrupting the memory/communications control block 102 to restore the memory card 100 from the sleep state, thereby starting a wait operation.

In the case of memory card 100 shown in FIG. 2, the reception of a beacon frame has to be executed within a certain period of time after the powering on of the host device 120, so that, once the memory card 100 gets in a sleep state, the host device 120 has to be turned off and then on again, thus requiring a user operation. Also, there is a wasted transponder's receiving operation when the power is turned on not for the communication with the reader/writer 700 but for the use of the host device 120. On the contrary, fifth the configuration shown in FIG. 7, because the DC voltage obtained by rectifying a non-modulated carrier or a dummy signal from the reader/writer 700 is used for the interrupt signal (INT) 401, no waste mentioned above is involved. In addition, before the transmission of a beacon signal (or before starting a service entry sequence), the reader/writer 700 can transmit a non-modulated carrier or a dummy signal to restore the memory card 100 in the service area from the sleep state to execute a wait operation.

Figure 8:
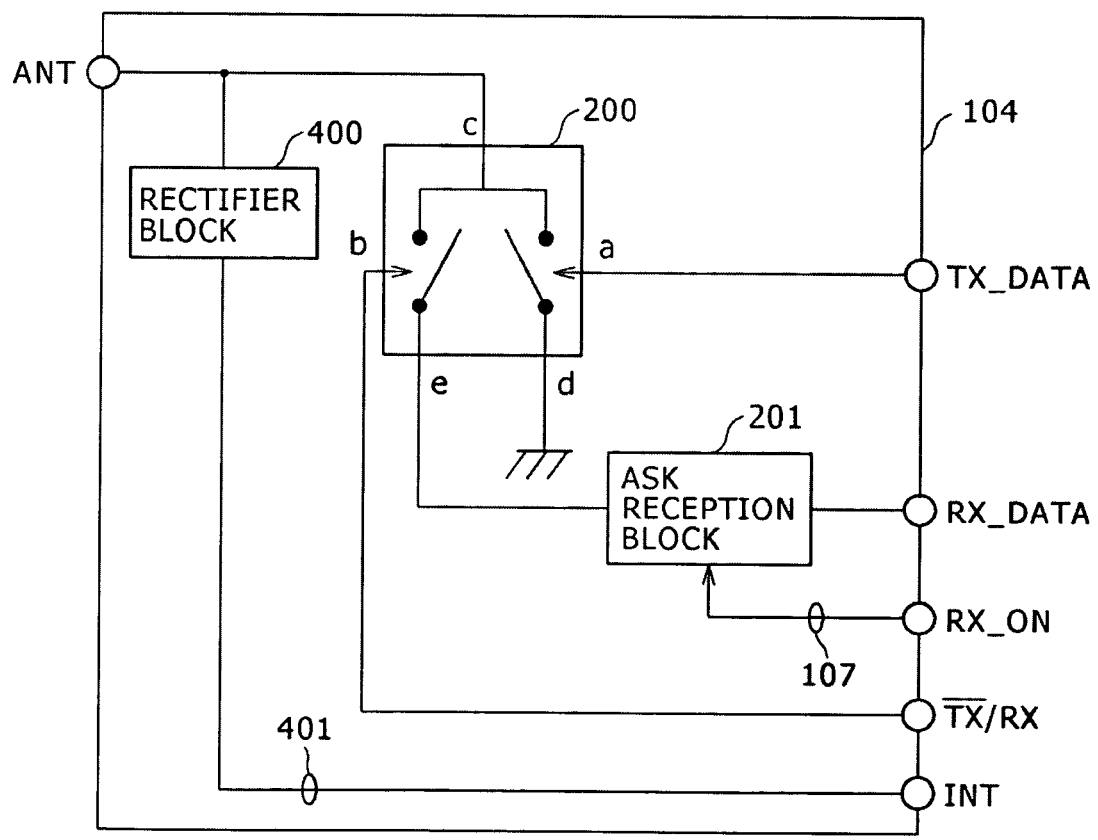
FIG. 8 is a circuit diagram illustrating another exemplary internal configuration of the radio block in the memory card shown in FIG. 7.

FIG. 8 shows an exemplary internal configuration of the radio block 104 in the memory card 100 shown in FIG. 7.

An antenna switch 200 of SPDT also functions to switch between generation and transmission/reception of reflected wave. Terminal c in the figure is connected to the antenna 105 in the memory card 100. The antenna switch 200 is made up of a GaAs IC for example, separately from another CMOS circuit module.

When transmission is made from the radio block 104, terminal b is turned off by a control signal (TX/RX) from a baseband control block (not shown), transmission data (TX_DATA) being applied from the baseband control block to terminal a. In the figure, the left-side switch grounds terminal d, shorting the terminal of the antenna 105 to ground when transmission data is "1" and opening the terminal of the antenna 105 when transmission data is "0". Thus, on the basis of a bit image of transmission data and depending of an impedance varying operation by use of the antenna switch 200, the non-modulated carrier received at the antenna 105 is phase-modulated to be radiated as a modulated reflected-wave signal.

On the other hand, in the reception by the radio block 104, terminal b is kept on by the baseband control block, not shown, and an ASK modulated signal received at the antenna 105 is transmitted to an ASK reception block 201 via terminal e to be demodulated into receive data (RX_DATA).

The radio block 104 shown in FIG. 8 has a rectification block 400, which is a main difference from the configuration example shown in FIG. 3. A signal obtained by rectification in the rectification block 400 to be smoothed into a DC current provides an interrupt signal (INT) 401, which is used as an interrupt signal for starting up the memory/communications control block 102 in a sleep state. Because the rectification block 400 need not be powered from the outside, it is not required to always flow current into the rectification block 400. In addition, because the rectification block 400 only generates an interrupt signal, it is enough for the rectification block 400 to be able to get an interrupt voltage rather than getting a current.

Figure 9:
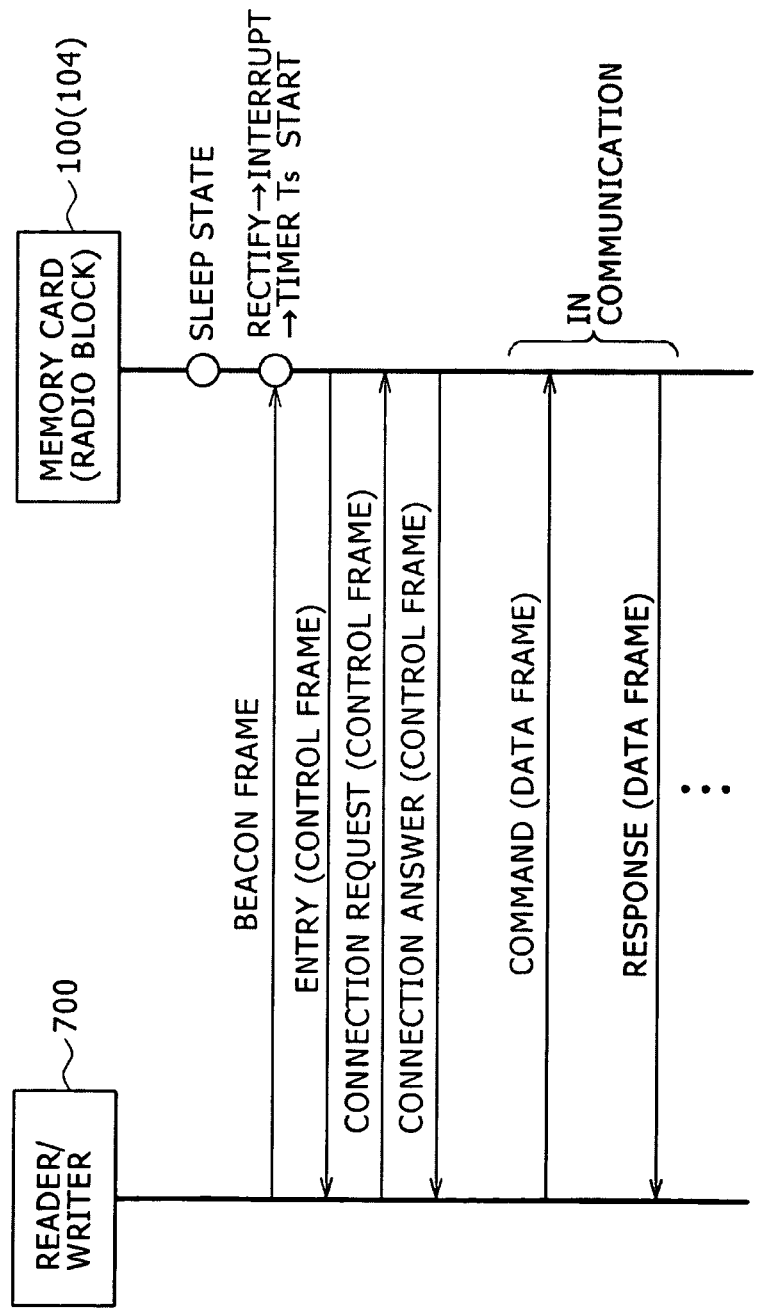
FIG. 9 is a sequence chart indicative of a communications control sequence in which the memory card shown in FIG. 7 communicates with the reader/writer.

FIG. 9 shows a communications control sequence in which the memory card 100 shown in FIG. 7 communicates with the reader/writer 700. In this sequence, it is assumed that the memory card 100 be in a wait state always in a sleep mode.

Before the transmission of a beacon signal (or the start of a service area sequence), the reader/writer 700 transmits a non-modulated carrier or a dummy signal. In contrast, the rectification block 400 rectifies a non-modulated carrier or a dummy signal received from the reader/writer 700 to generate a DC voltage and uses the generated DC voltage as an interrupt signal (INT) 401 for interrupting the memory/communications control block 102 to restore the memory card 100 from the sleep state, thereby starting a wait operation. Also, at this moment, the timer 106 is started, thereby turning on the receiving operation of the radio block 104 as a transponder for a period in which timer $T_S$ for waiting a connection signal from the reader/writer 700 is expired.

Next, in order to tell a service area of own station, the reader/writer 700 transmits a beacon frame and, in an entry period to be provided after the transmission of the beacon frame, continues transmitting a non-modulated carrier for operating the transponder.

When the radio block 104 detects that the radio block 104 is inside the service area of the reader/writer 700 by receiving a beacon frame, the radio block 104 gets the information about a communications frequency channel to be used and the unique ID of the reader/writer 700 on the basis of the information written to the payload of the received beacon frame. Next, when the radio block 104 wants to connect with the reader/writer 700, the radio block 104 returns an entry frame by use of a non-modulated carrier transmitted from the reader/writer 700 over an entry period.

On the basis of the contents of the returned entry frame, the reader/writer 700 gets the unique ID of the radio block 104 (or the memory card 100) as a transponder and the information about settable communications parameters. Then, when the reader/writer 700 wants to communicate with the memory card 100, the reader/writer 700 transmits a connection request frame with the information specifying communications parameters written to the payload. If the memory, card 100 responds to the connection request, the memory card 100 returns a connection answer frame with a connection result written to the payload to the reader/writer 700 via the radio block 104 upon which the connection is established.

While the connection is in the established state, the transmission of a command frame from the reader/writer 700 and the return of a response frame from the radio block 104 are repeated (not shown), thereby executing information reading and writing operations with the flash memory 103 in the memory card 100.

Figure 10:
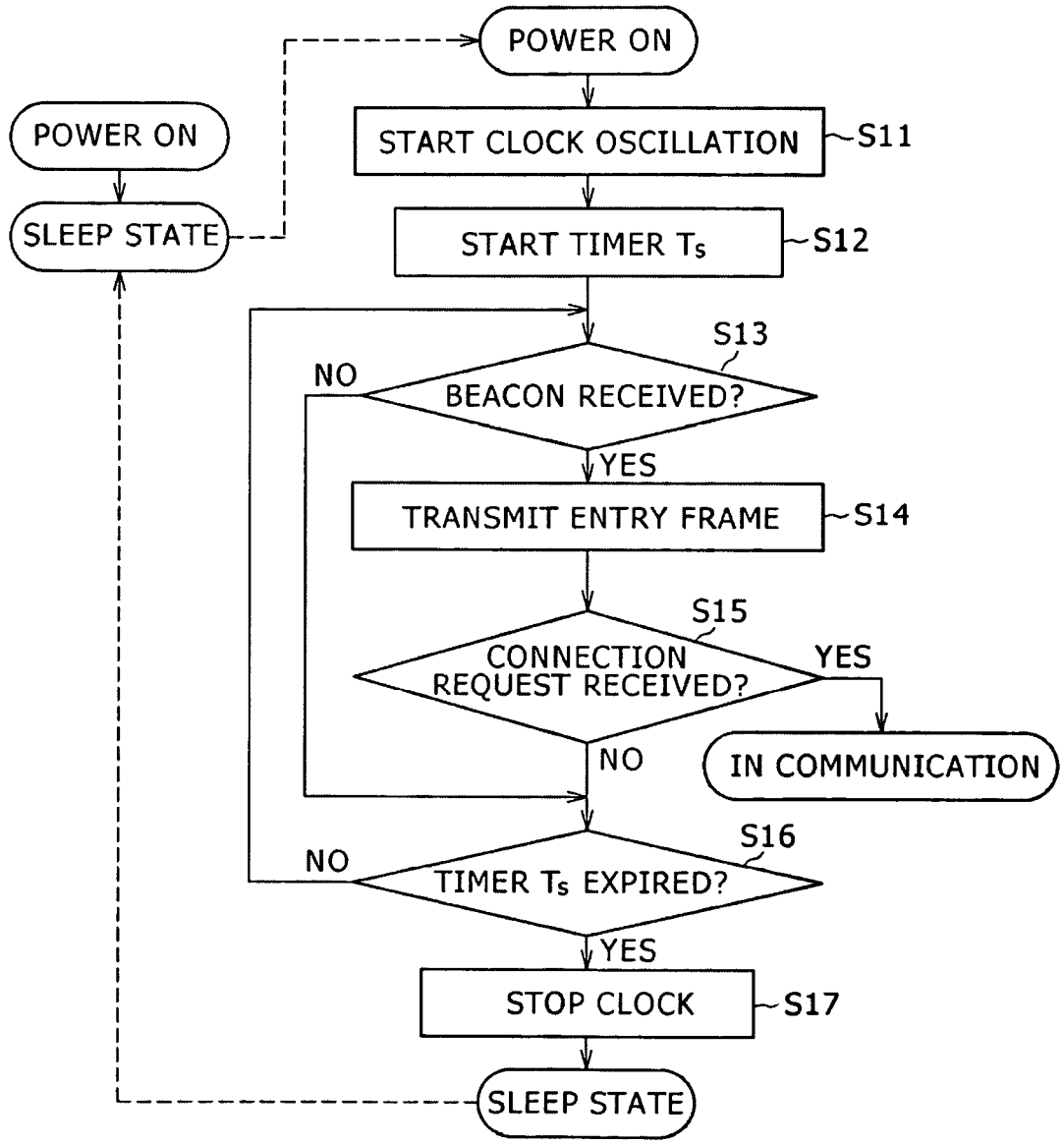
FIG. 10 is a flowchart indicative of a power control procedure in the memory card shown in FIG. 7.
Figure 11:
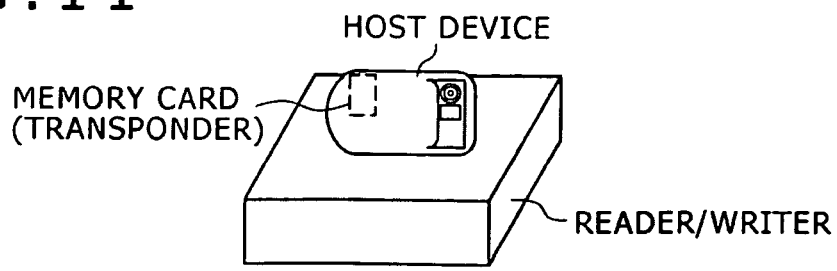
FIG. 11 is a perspective view of a noncontact system in one form of use.

Thus, in the communications control procedure shown in FIG. 9, the memory card 100 executes power control in accordance with the timing of getting a startup interrupt signal by rectifying the beacon signal (or the non-modulated carrier or the dummy signal transmitted before the beacon signal) received from the reader/writer 700. FIG. 10 shows a flowchart indicative of a power control procedure to be executed in the memory card 100 shown in FIG. 7.

When the host device 120 is powered on, the memory card 100 gets in a wait state. However, if the memory card 100 does not enter a communication state with the reader/writer 700 before timer $T_S$ expires, the memory card 100 immediately gets in a sleep state. As described before, the memory card 100 is interrupted for startup by a non-modulated carrier or a dummy signal transmitted from the reader/writer 700 and therefore can be restored from a sleep state to a communications state, so that timer $T_S$ can be set to a relatively short time.

When a non-modulated carrier or a dummy signal arrives at the memory card 100 from the reader/writer 700 that is in a sleep state, the rectification block 400 rectifies the received non-modulated carrier or dummy signal to generate a startup interrupt signal (INT) 401 for the memory/communications control block 102.

In the memory card 100, the internal clock starts oscillating in accordance with this interrupt signal (INT) 401 (step S11).

In the memory/communications control block 102, the timer 106 for clocking the wait time for a beacon frame from the reader/writer is started (step S12). The timer 106 activates an RX_ON signal 107 until timer $T_S$ expires, thereby turning on the reception of the radio block 104.

While the reception is on, the radio block 104 checks whether a desired beacon frame has arrived from the reader/writer 700 (step S13).

If the desired beacon frame is found not received (NO in step S13), hen the procedure goes to step S16 by skipping steps S14 and S15.

On the other hand, if a desired beacon frame is found received (YES in step S13), then the radio block 104 returns an entry, frame by use of a non-modulated carrier transmitted from the reader/writer 700 over an entry period (step S14).

Next, the radio block 104 waits for a connection request frame from the reader/writer 700 (step S15). If a connection request frame has been received (YES in step S15), then the radio block 104 returns a connection answer frame to the reader/writer 700, upon which the connection is established, getting in a communications state with the reader/writer 700.

If no desired beacon frame is found received from the reader/writer 700 (NO in step S13) or no connection request frame is found received from the reader/writer 700 although an entry frame has been returned in response to the reception of a desired beacon frame (NO in step S15), then the radio block 104 checks whether timer $T_S$ has expired in the timer 106 (step S16).

If timer $T_S$ is found not expired (NO in step S16), then the procedure returns to step S13 to wait for a beacon frame.

If no beacon frame has been received or although an entry frame has been returned in response to a received beacon frame, a connection request frame has not been received from the reader/writer 700, thereby disabling the establishment of connection with the reader/writer 700 until timer $T_S$ in the timer 106 has expired (YES in step S16), the memory card 100 stops the internal clock (step S17) to stop all internal operations, getting into a sleep state.

After the host device 120 is powered on, the memory card 100 immediately gets in a sleep state. However, because the memory card 100 enters a wait state for a certain period with a beacon signal transmitted from the reader/writer 700 used as a trigger, low power dissipation can be realized. Although there is a problem that the memory card 100 also reacts to signals other than the beacon signal transmitted from the reader/writer 700 because the rectification voltage is used as an interrupt signal, if a desired beacon frame cannot be received for ever, a time-out occurs to put the memory card 100 into a sleep state again.

While preferred embodiments have been described using specific terms, such description is for illustrative purpose only, and it is to be understood that changes and variations may be made without departing from the spirit or scope of the following claims.

So far herein, embodiments applied to communications systems that execute reflected-wave transmission have mainly described; however, the scope of the present application is not limited thereto. For example, the present application is also applicable to various kinds of communications systems in which the transponder having no radio wave generating source of its own transmits data to the reader/writer in a noncontact manner, such as electrostatic coupling and electromagnetic inducting.

For example, the present application relates to a use form in which a memory card having transponder capabilities is used as loaded on a host device such as a digital camera or a mobile phone for example allows the significantly lowering of the power dissipation in a wait state and contributes to low dissipation of the battery-driven host device. The memory, card referred to herein includes an SD (Secure Digital) memory card, a MemoryStick (registered trademark), a SIM (Subscriber Identity Module) card, and other cartridge-type memory devices that are used as inserted in the dedicated slot of each host device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communications system comprising:
a transponder having no radio wave generating source executes data transmission with a reader/writer, wherein
said transponder is incorporated in a memory card having an internal clock and a memory with which said reader/writer reads and writes information, said memory card being used as loaded in a dedicated slot of a host device;
said reader/writer transmits a beacon signal telling a service area of said reader/writer at a predetermined time interval; and
said memory card waits, during a wait state in which the internal clock is oscillating, for a beacon signal from said reader/writer within a preset period of time after said host device loaded with said memory card is powered on, executes a connection establishment procedure with said reader/writer upon reception of said beacon signal within said preset period of time and, if said beacon signal has not been received within said preset period of time, enters a sleep state in which at least a wait state of said transponder is stopped and the internal clock is stopped and not oscillating.

2. The communications system according to claim 1, wherein said memory card has rectifying means for obtaining a direct-current voltage by rectifying a signal received from said reader/writer and said memory card returns from said sleep state by use of said direct-current voltage obtained from said rectifying means as a startup interrupt signal to make said transponder wait for said beacon signal.

3. The communications system according to claim 1, wherein the transponder includes an antenna load impedance switch configured to allow a high-speed switching operation with low power dissipation.

4. A communications system comprising a transponder having no radio wave generating source executes data transmission with a reader/writer, wherein
said transponder is incorporated in a memory card having an internal clock and a memory with which said reader/writer reads and writes information, said memory card being used as loaded in a dedicated slot of a host device;
said reader/writer transmits a beacon signal telling a service area of said reader/writer at a predetermined time interval; and
said memory card has rectifying means for obtaining a direct-current voltage by rectifying a signal received from said reader/writer, is normally in a sleep state in which at least a wait state by said transponder is stopped and the internal clock is stopped and not oscillating, and returns from said sleep state by use of said direct-current voltage obtained by said rectifying means as a startup interrupt signal, executing a beacon signal waiting by said transponder by starting an internal clock in response to the startup interrupt signal to enter a wait state during which the internal clock is oscillating.

5. The communications system according to claim 4, wherein said memory card has a timer for executing a connection wait operation for a preset period of time, starts said timer when said memory card returns from said sleep state by use of said direct-current voltage obtained by said rectifying means as a startup interrupt signal, executes a connection establishment procedure with said reader/writer in accordance with reception of said beacon signal before said timer expires, and, if said timer expires before reception of said beacon signal, gets in said sleep state.

6. The communications system according to claim 4, wherein the transponder includes an antenna load impedance switch configured to allow a high-speed switching operation with low power dissipation.

7. A memory card to be used on a host device as loaded in a dedicated slot thereof, comprising:
   storage means for storing data;
   a terminal block configured to connect said memory card with said host device through said dedicated slot;
   a radio block configured to operate as a transponder in a communications system in which a transponder having no radio wave generating source executes data transmission with a reader/writer;
   a control block configured to control access by said terminal block and said radio block to said storage means; and
   a timer configured to provide waiting, during a wait state in which an internal clock is oscillating, for a signal from said reader/writer for a preset period of time,
   wherein said memory card starts up said timer in response to detection, through said terminal block, of power-on of said host device, executes a connection establishment procedure with said reader/writer in response to reception of a beacon signal from said reader/writer before said timer expires, and, if said timer expires before a beacon signal is received, enters a sleep state in which at least a wait state of said radio block is stopped and the internal clock is stopped and not oscillating.

8. The memory card according to claim 7, further comprising:
   rectifying means for rectifying a signal received from said reader/writer into a direct-current voltage, wherein said memory card returns from said sleep state by use of said direct-current voltage obtained by said rectifying means as a startup interrupt signal, waiting for a signal from said reader/writer.

9. The memory card according to claim 7, wherein the radio block includes an antenna load impedance switch configured to allow a high-speed switching operation with low power dissipation.

10. A memory card to be used on a host device as loaded in a dedicated slot, comprising:
    storage means for storing data;
    a terminal block configured to connect said memory card with said host device through said dedicated slot;
    a radio block configured to operate as a transponder in a communications system in which a transponder having no radio wave generating source executes data transmission with a reader/writer;
    a control block configured to control access by said terminal block and said radio block to said storage means; and
    rectifying means for rectifying a signal received from said reader/writer into a direct-current voltage,
    wherein said memory card is normally in a sleep state in which at least a wait state of said radio block is stopped and an internal clock is stopped and not oscillating, returns from said sleep state by use of a direct-current voltage obtained by said rectifying means as a startup interrupt signal, and waits, during a wait state in which an internal clock is oscillating, for a beacon signal from said reader/writer by starting the internal clock in response to the startup interrupt signal.

11. The memory card according to claim 10, further comprising:
    a timer configured to provide waiting for a signal from said reader/writer for a preset period of time,
    wherein said memory card starts said timer when said memory card returns from said sleep state by use of a direct-current voltage obtained by said rectifying means as a startup interrupt signal, executes a connection establishment procedure with said reader/writer in response to reception of a beacon signal from said reader/writer before said timer expires, and, if said timer expires before reception of a beacon signal, gets in said sleep state.

12. The memory card according to claim 10, wherein the radio block includes an antenna load impedance switch configured to allow a high-speed switching operation with low power dissipation.

* * * * *